United States Patent [19]

Kubena et al.

[11] Patent Number: 5,665,253
[45] Date of Patent: Sep. 9, 1997

[54] METHOD OF MANUFACTURING SINGLE-WAFER TUNNELING SENSOR

[75] Inventors: Randall L. Kubena, Agoura; Gary M. Atkinson, Thousand Oaks, both of Calif.

[73] Assignee: Hughes Electronics, Los Angeles, Calif.

[21] Appl. No.: 456,211

[22] Filed: May 31, 1995

Related U.S. Application Data

[62] Division of Ser. No. 292,897, Aug. 19, 1994, Pat. No. 5,596,194.

[51] Int. Cl.$^6$ .................. H01L 21/027; H01J 37/244
[52] U.S. Cl. .................. 216/41; 73/105; 216/66; 216/67; 216/74; 216/79; 250/306; 250/307; 250/423 F
[58] Field of Search .................. 216/41–51, 65–67, 216/74, 79; 250/306, 307, 423 F; 73/105

[56] References Cited

U.S. PATENT DOCUMENTS

| | | | |
|---|---|---|---|
| 4,275,286 | 6/1981 | Hackett | 216/66 |
| 4,724,318 | 2/1988 | Binning | 250/306 |
| 4,806,755 | 2/1989 | Duerig et al. | 250/306 |
| 5,085,070 | 2/1992 | Miller et al. | 73/105 |
| 5,140,164 | 8/1992 | Talbot et al. | 216/66 |
| 5,209,117 | 5/1993 | Bennett . | |
| 5,241,862 | 9/1993 | Abbink et al. . | |
| 5,265,470 | 11/1993 | Kaiser et al. . | |
| 5,275,047 | 1/1994 | Zabler et al. | 73/505 |
| 5,285,686 | 2/1994 | Peters . | |
| 5,290,102 | 3/1994 | Kaiser et al. . | |
| 5,293,781 | 3/1994 | Kaiser et al. . | |
| 5,315,247 | 5/1994 | Kaiser et al. . | |
| 5,377,545 | 1/1995 | Norling et al. . | |
| 5,431,051 | 7/1995 | Biebl et al. . | |
| 5,438,870 | 8/1995 | Zabler et al. | 57/290 |

FOREIGN PATENT DOCUMENTS

| | | |
|---|---|---|
| 03 101127 | 4/1991 | European Pat. Off. . |
| 0 619 494 | 10/1994 | European Pat. Off. . |
| 40 32 559 | 4/1992 | Germany . |
| 59-171141 | 1/1985 | Japan . |
| 4-369418 | 12/1992 | Japan . |

OTHER PUBLICATIONS

Kobayashi et al, "An Integrated Lateral Tunneling Unit", Micro Electro Mechanical Systems, US, New York, IEEE, Feb. 4–7 1992, pp. 214–219.

T. W. Kenny, et al., "Micromachined tunneling displacement transducers for physical sensors", Journal of Vacuum Science & Technology, Jul./Aug., 1993, pp. 797–802.

W. J. Kaiser, et al. "Tunnel–Effect Displacement Sensor", NTIS Tech Notes, Apr., 1990.

T. W. Kenney et al., "Micromachined silicon tunnel sensor for motion detection," *Applied Phys. Lett* 58 (1), 7 Jan. 1991, pp. 100–102.

*Primary Examiner*—T. Tung
*Attorney, Agent, or Firm*—Vijayalakshmi Duraiswamy; Wanda K. Denson-Low

[57] ABSTRACT

A tunneling tip sensor and a method of photolithographically fabricating a unitary structure sensor on a semiconductor substrate are disclosed. A cantilever electrode is formed on the substrate with one end suspended above the substrate at a distance from a tunneling electrode so that a tunneling current flows through the cantilever and tunneling electrodes in response to an applied bias voltage. The cantilever and tunneling electrodes form a circuit that produces an output signal. A force applied to the sensor urges the cantilever electrode to deflect relative to the tunneling electrode to modulate the output signal. In the preferred embodiment, the output signal is a control voltage that is applied between the cantilever electrode and a control electrode to maintain a constant tunneling current. In an alternative embodiment, a lateral control electrode is fabricated to produce a lateral motion of the cantilever electrode such that the sensor detects a rotation. In another embodiment, x, y and z-axis sensors are fabricated on a substrate to provide a planar three-axis sensor.

18 Claims, 6 Drawing Sheets

METHOD OF MANUFACTURING SINGLE-WAFER TUNNELING SENSOR

This is a division of application Ser. No. 08/292,897 filed Aug. 19, 1994, now U.S. Pat. No. 5,596,194.

BACKGROUND OF THE INVENTION

1. Field of the Invention

The present invention generally relates to the field of electro-mechanical sensors for measuring an applied force, and more specifically to a tunneling-tip sensor and a photolithography method for fabricating the sensor.

2. Description of the Related Art

One method for sensing physical quantities such as linear or rotational acceleration, or acoustic or hydrophonic pressure is to provide a flexible member that flexes in response to an applied force and measures the amount of flex electrically. Conventional micro-mechanical techniques for achieving the transduction include capacitive coupling, piezoresistive sensing and piezoelectric sensing. However, none of these techniques are inherently as sensitive as tunneling tip transduction.

In tunneling tip sensors, a bias voltage is applied across a flexible counter electrode and a tunneling tip with a sufficiently small gap between the two components to induce a tunneling current to flow. The tunneling current $I_T$ is given by: $I_T \propto V_B \exp(-\alpha h \sqrt{\phi})$, where $V_B$ is the bias voltage, $\alpha$ is a constant, h is the electrode-to-tip separation and $\phi$ is the work function. As the applied force changes, the separation between the electrode and the tip changes and modulates the tunneling current, which varies by approximately a factor of three for each angstrom (Å) of electrode deflection. Thus, tunneling tip detectors can provide a much greater sensitivity and a larger bandwidth than previous method of detections and still provide easily measurable signals.

For the specific application of the sensor as an accelerometer, the deflection distance x=ma/k, where m is the electrode's mass, k is the electrode's spring constant and a is the acceleration. The effective bandwidth of the accelerometer is determined by its resonant frequency $$w = \sqrt{\frac{k}{m}}.$$

Since tunneling tip techniques are more sensitive to deflection, the accelerometer's mass can be relatively small, and thus its bandwidth can be larger than the capacitive coupling and piezoresistive devices.

A tunnel tip sensor and its fabrication method are disclosed in Kenney et al., "Micromachined silicon tunnel sensor for motion detection," *Applied Physics Letters* Vol. 58, No. 1, Jan. 7, 1991, pages 100–102. A flexible folded cantilever spring and a tunneling tip are formed on a first silicon wafer by etching completely through the wafer to form a proof mask pattern. The pattern defines an inner rectangular area that is suspended by first and second folded flexible members that extend from the outer portion of the wafer to the inner rectangle. The cantilever spring and tunneling tip are formed by thermally evaporating gold through respective shadow masks onto the patterned wafer to define respective contacts on the wafer's outer portion that extend therefrom along the respective folded members to a rectangular mass and a tip on the inner rectangular portion of the wafer. The cantilever spring and tunneling tip are physically connected by the proof mask which allows them to deflect in unison in response to an applied force but are electrically isolated from each other. A second wafer is etched to define a hole approximately the size of the cantilever spring's rectangular mass and a tunneling counter electrode. A third wafer is etched to define a deflection counter electrode approximately the size of the cantilever spring's rectangular mass. The 200 μm thick wafers are then pinned or bonded together by placing the first wafer with the cantilever spring and tip face up on the bottom, and placing the second wafer with the tunneling counter electrode suspended above the tip at a separation of approximately 50 μm and the hole above said cantilever spring's mass. The third wafer is placed on top of the second with the deflection counter electrode disposed above the hole such that it is suspended above the cantilever spring. The three wafers are mechanically attached with alignment pins or epoxy and electrically connected to a separate analog feedback circuit.

A control voltage is applied between the deflection counter electrode and the cantilever spring to provide an attractive force that brings the tip close enough to the tunneling counter electrode for a bias voltage applied between the tunneling counter electrode and the tip to induce a tunneling current of approximately 1.3 nA. The cantilever spring and tip deflect in response to an applied force to modulate the tunneling current. The cantilever spring provides the mass required to produce a measurable deflection and the desired sensitivity for the accelerometer. The analog feedback circuit compares the measured tunneling current to a setpoint, and modulates the control voltage to adjust the separation between the tunneling counter electrode and the tip to maintain a constant current. The modulated control voltage provides an output proportional to the applied force.

Although this tunneling tip sensor provides a more sensitive and compact sensor than the other conventional sensors, its fabrication method and structure have several deficiencies. Fabricating three separate 200 μm wafers and boding them together produces sensors that are approximately 4 cm² in area, with manufacturing yields of approximately 5%. These relatively large size and low yield sensors are very expensive to manufacture. The tip-to-tunneling electrode separation is nominally 50 μm and requires a control voltage of approximately 200 volts to bring the tip close enough to the tunneling electrode to induce the tunneling current. The high voltage levels are not compatible with other TTL or CMOS circuitry and variations in the separation cause large variations in the required control voltage. The cantilever spring has a mass of 30 mg, which restricts the resonant frequency to approximately 200 Hz and a bandwidth that is comparable to those of other conventional techniques. The accelerometer fails to achieve a larger bandwidth because of its relatively large mass. The design of the cantilever spring makes the sensor sensitive to off-axis (x or y-axis) forces and large temperature coefficients and drift. Furthermore, when the feedback circuit is turned off, a large shock can deflect the spring, causing the tip to impact the tunneling counter electrode and be damaged due to the relatively large spring mass.

SUMMARY OF THE INVENTION

The present invention seeks to provide a tunneling tip sensor and a method of fabricating the sensor that results in a higher manufacturing yield, smaller size, higher bandwidth, finer tip-to-cantilever control, lower control voltages, lower off-axis sensitivity, lower temperature sensitivity, greater shock resistance and lower cost.

These goals are achieved with a tunneling tip sensor that has a unitary structure and is formed on a semiconductor substrate. A cantilever electrode extends from the substrate with one end suspended above a tunneling electrode on the substrate so that a tunneling current flows between the cantilever and tunneling electrodes in response to an applied bias voltage. The cantilever and tunneling electrodes together define an electrical circuit that is modulated by the cantilever electrodes deflection in response to an applied force. The modulation is sensed either by holding the bias voltage constant and sensing changes in the current, or in the preferred embodiment, by adjusting a control voltage between the cantilever electrode and a control electrode to maintain the current constant and using changes in the control voltage as an indication of the circuit modulation.

The tunneling tip sensor is fabricated by providing the semiconductor substrate with a layer of conductive material, and photolithographically patterning the conductive material to form a cantilever pad and a tunneling electrode. The cantilever pad is photolithographically extended to form a cantilever arm that is suspended over the substrate such that the arm deflects relative to the tunneling electrode in response to an applied force.

In an alternative embodiment, a lateral control electrode is fabricated to produce a lateral motion of the cantilever arm such that the sensor detects a rotation. In another embodiment, x, y and z-axis sensors are fabricated on a substrate to provide a planar three-axis sensor. In a further embodiment, a 3-D inertial cube sensor includes z-axis and rotational sensors formed on three mutually orthogonal faces to provide x-y-z axis accelerometers and gyros.

For a better understanding of the invention, and to show how the same may be carried into effect, reference will now be made, by way of example, to the accompanying drawings.

DETAILED DESCRIPTION OF THE INVENTION

Figure 1A:
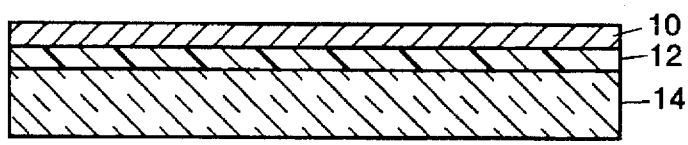
FIGS. 1a–1j are sectional views illustrating the photolithography method used to fabricate a z-axis sensor.
Figure 1B:
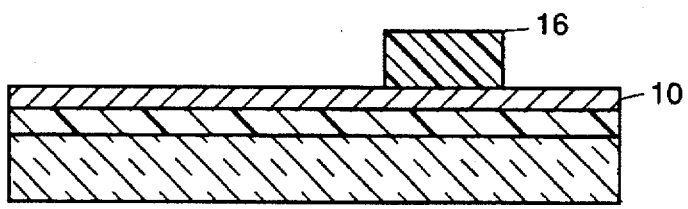
Figure 1C:
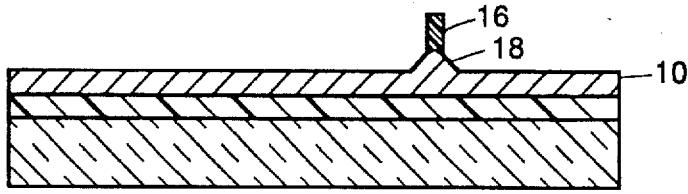
Figure 1D:
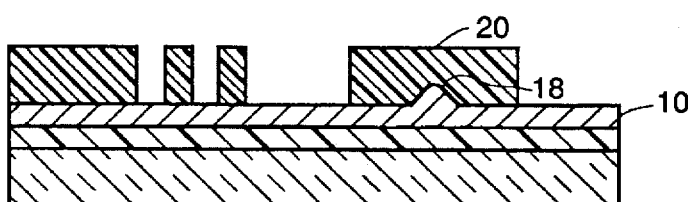
Figure 1E:
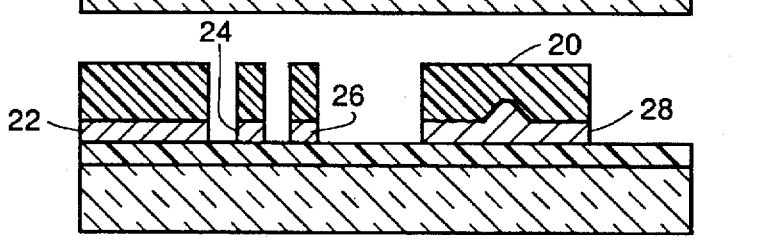

FIGS. 1a through 1j show a preferred method for fabricating a z-axis tunneling tip sensor that can be used for measuring forces applied to the sensor by linear or rotational accelerations, or by acoustic or hydrophonic pressures. The preferred method uses photolithography to fabricate the entire sensor as a unitary structure on a semiconductor wafer. As shown in FIG. 1a, the photolithography method starts by thermally evaporating a metal layer 10, preferably gold and approximately 1.2 µm thick, onto a dielectric layer 12 such as $SiO_2$ that is disposed on a semiconductor substrate 14, preferably silicon. In the next step a negative resist 16, approximately 0.2–0.5 µm high, is patterned over the metal layer 10 (FIG. 1b). The metal layer 10 is then etched by an ion milling process of $Ar^+$ at 500 eV to a thickness of approximately 0.7 µm to define a tip 18 having a height of approximately 0.5 µm (FIG. 1c). The negative resist 16 is gradually eroded by the ion milling process so that the tip is graded from a relatively wide base to an upper end. In subsequent steps the negative resist 16 is removed and a positive resist 20 is patterned over the metal layer 10 and tip 18 (FIG. 1d). The metal layer 10 is etched with a similar ion milling process through to the $SiO_2$ layer 12 to define a cantilever pad 22, a control electrode 24, a test electrode 26 and a tunneling electrode 28 that includes the tip 18 (FIG. 1e).

Figure 1F:
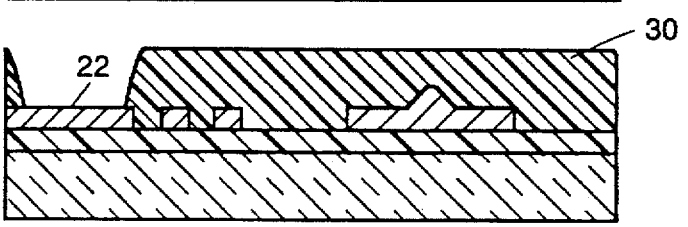
Figure 1G:
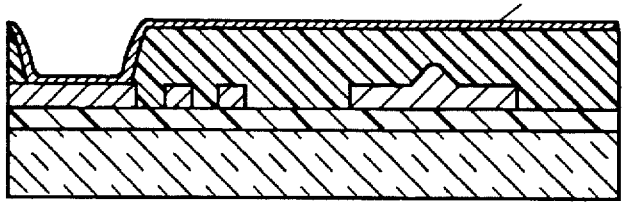
Figure 1H:
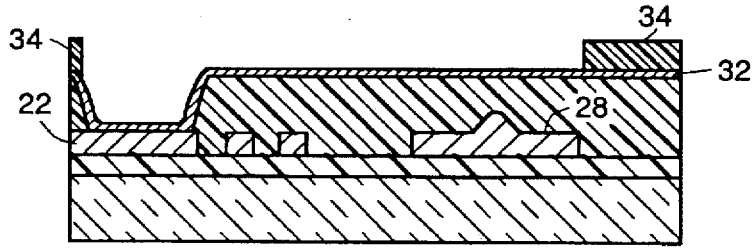
Figure 1I:
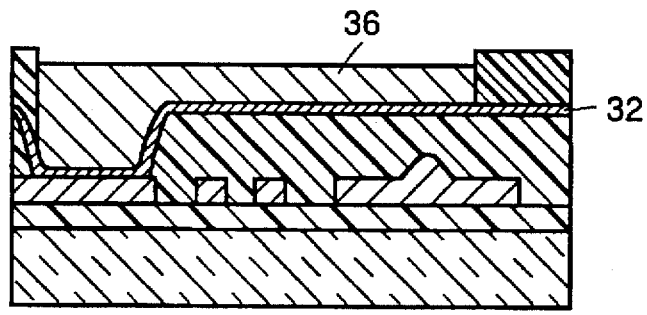
Figure 1J:
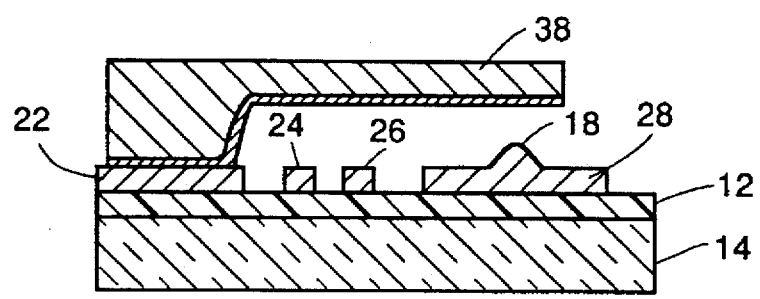

In the next step the resist 20 is removed and a sacrificial layer 30, preferably a photoresist, is patterned over substrate 14 to expose the cantilever pad 22 (FIG. 1f). The sacrificial layer 30 extends upwardly approximately 1 µm from the top of the cantilever pad 22. (It can be planarized by using photolithography to remove the sacrificial layer over the electrodes and then spinning additional resist on top of the wafer to the required thickness.) Alternatively the sacrificial layer could be a spin-on glass material or an oxide such as silicon dioxide. A thin layer of metal 32, approximately 200Å thick and preferably gold, is evaporated over the wafer to form a solid contact with the cantilever pad 22 (FIG. 1g). In the next step a resist 34 is patterned over the metal layer 32 to define a void that extends from the end of the tunneling electrode 28 to the far end of the cantilever pad 22 (FIG. 1h). The thin metal layer 32 forms a base for plating on a metal electrode 36 by electrolysis in the next step (FIG. 1i). The electrode 36 is preferably gold and approximately 400Å to 10 µm thick, 2–400 µm wide and 10–1000 µm long. This method can produce a low stress electrode 36 that will not bend under its own stress when suspended. In the last steps (FIG. 1j) the resist 34 is removed, the exposed portions of layer 32 are removed by ion milling, and sacrificial layer 30 is removed. Various methods of sacrificial layer removal can be utilized to minimize stiction problems. These include but are not limited to various high vapor pressure liquid rinses, $O_2$ plasma ashing or critical point drying. This leaves a cantilever arm 38 attached to the cantilever pad 22 and suspended above substrate 14. The control electrode 24, test electrode 26 and tip 18 are exposed, with an arm-to-tip distance of approximately 0.5 µm. Making the width of the cantilever arm 38 much greater than its thickness reduces the sensor's sensitivity to off-axis forces.

In an alternative embodiment, the tip 18 is formed on the underside of cantilever arm 38 instead of on the tunneling electrode 28. In this case the fabrication steps of FIGS. 1b and 1c are omitted, and the tip is formed by etching a tapered depression with a shape complementary to the desired tip shape in the sacrificial layer 30 above the tunneling electrode before the gold layers 32, 36 are added. The result is a cantilever electrode with a tunneling tip suspended above the tunneling electrode.

Figure 3:
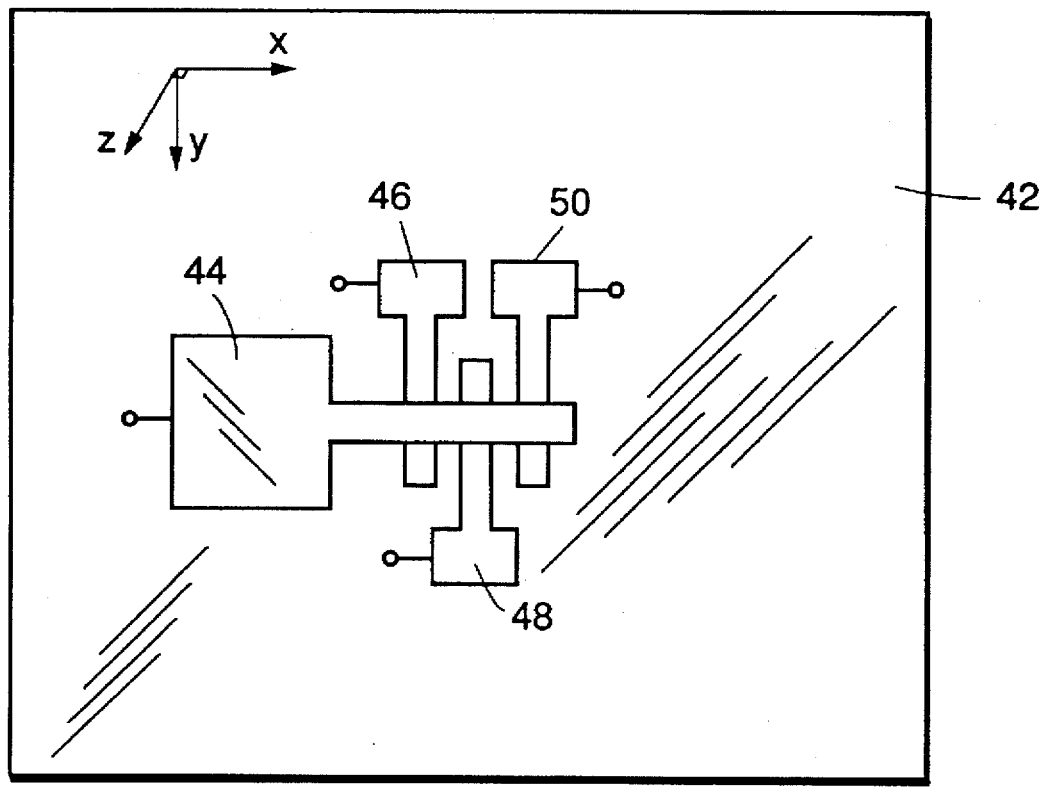
FIG. 3 is a plan view of the z-axis sensor.
Figure 2:
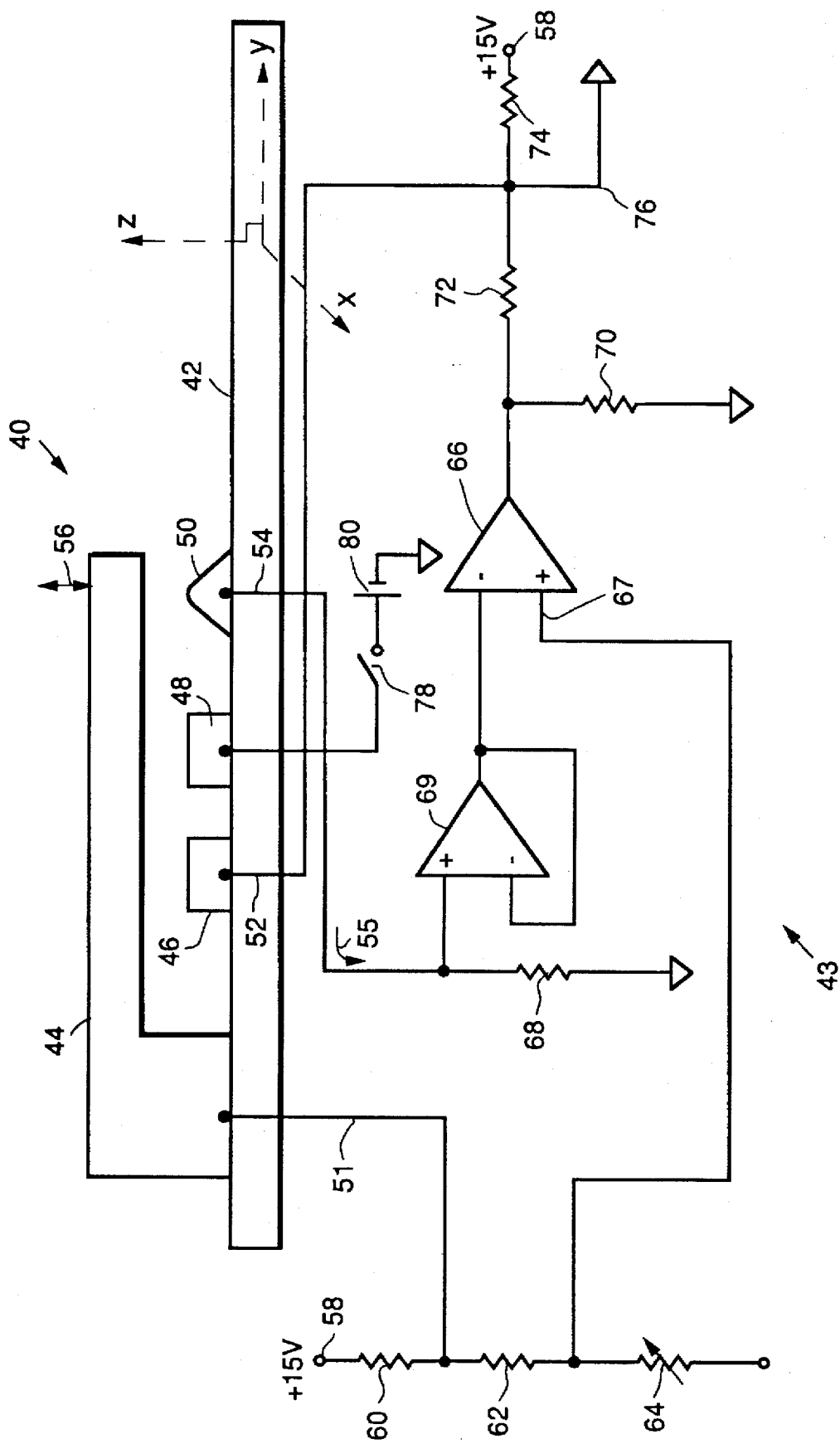
FIG. 2 is a sectional view of a completed z-axis sensor including a schematic diagram of an analog feedback circuit.

FIG. 2 shows a sectional view of a z-axis tunneling tip sensor 40 that has been fabricated as described in connection with FIGS. 1a–1j on a semiconductor wafer 42 that lies in the plane defined by the x and y axes, together with an analog feedback circuit 43 that controls its operation. FIG. 3 is a plan view of the z-axis sensor 40 that lies in the xy-plane and extend therefrom. One end of a cantilever electrode 44 is affixed to the wafer, while its other end is suspended approximately 1–2 µm above the wafer's surface over a control electrode 46, a test electrode 48 and a tunneling tip electrode 50. Device encapsulation can be accomplished with several packaging designs if needed for environmental control or vacuum operation.

Circuit 43 applies a control voltage via leads 51 and 52 across the cantilever electrode 44 and the control electrode 46 to create an attractive electric field which pulls the cantilever down to a reference position close to the tunneling tip, e.g., 1–2 nm away from the tip. The circuit also applies a bias voltage via leads 51 and 54 across the cantilever electrode and tip sufficient to initiate a flow of tunneling current 55 through them. The circuit is designed to respond to a deflection of cantilever arm 44 by modulating the control voltage while holding the tunneling current constant, so that the value of the control voltage at any given time indicates the degree of cantilever arm flexure. Alternatively, the control voltage could be held constant and tunneling current modulated, or a combination of both approaches could be used, but modulating the control voltages makes the device less susceptible to damage and effectively linearizes the output signal.

In circuit 43 a supply voltage is applied via a reference terminal 58 across a series connection of resistors 60, 62 and a variable resistor 64, preferably 1 MΩ, 10 kΩ and nominally 2 kΩ to ground reference potential. The cantilever electrode 44 is electrically connected to the junction of resistors 60 and 62, and the junction of resistors 62 and 64 is connected to the non-inverting input 67 of an operational amplifier 66 to provide a reference voltage. The tunneling electrode 50 is connected through an input resistor 68 to ground reference potential, and is also connected to the non-inverting input of an operational amplifier 69. The amplifier 69 is connected as a voltage follower, with its output connected to amplifier 66's inverting input. The output of amplifier 66 is connected through a resistor 70, preferably 10 kΩ, to ground potential and through a series connection of resistors 72 and 74, preferably 4 MΩ and 1 MΩ, to the supply potential terminal 58. The junction of resistors 72 and 74 is electrically connected to control electrode 46 via line 52 to provide the control voltage, which is monitored at output node 76 and is generally proportional to the square root of an applied force 56. The value of resistor 64 is selected to equalize the voltages at amplifier 66's differential inputs for a reference value of tunneling current, preferably 1 nA, such that the amplifier's output is zero when the cantilever arm is undeflected from the reference position and the control voltage remains constant.

The applied force 56, which may be due for example to an acceleration or an acoustic or hydrophonic pressure wave, tends to deflect the cantilever arm. This initially alters the tunneling current 55 and produces unbalanced differential inputs for amplifier 66. The amplifier responds by modulating the control voltage on lead 52 to produce an opposing force to the applied force, thus maintaining a constant cantilever-to-tunneling electrode separation and a constant tunneling current 55. If the applied force causes the cantilever to bend upwards, the separation increases and the tunneling current decreases such that the voltage at the non-inverting input of amplifier 66 is more than the voltage at its inverting input. The amplifier's output is positive, and thus increases the control voltage and the attractive force on the cantilever arm to bring it back to the reference position. Conversely, if the force tends to deflect the cantilever arm downwards, the tunneling current increases and the amplifier's output goes negative, thus reducing the attractive force and allowing the cantilever spring to pull itself back to the reference position. Without its feedback circuit, the cantilever arm can deflect excessively and damage the tunneling electrode. Furthermore, in the absence of a feedback circuit the sensor's output would be linear only over very small deflections.

The sensor is calibrated periodically by closing a witch 78 to apply a known voltage from a DC source 80 to the test electrode 48 to simulate an applied force, and measuring the resulting output (calibration) voltage. In normal operation, the output would be scaled by the calibration response to produce a normalized output that compensates for drifts in the sensor performance caused by temperature changes, component aging and the like.

The photolithographic fabrication method produces a very small device having a cantilever mass of approximately 1 μg, while maintaining the sensor's deflection sensitivity. Consequently, when used as an accelerometer, the sensor's resonant frequency can be much higher than previous art and can have an effective bandwidth as high as 250 kHz. Another benefit of the extremely small mass is an improved shock resistance. When the control voltage is turned off, the cantilever arm can deflect in response to a large acceleration and may slam into and damage the tip. However, because the mass is very small, the tip pressure for a given acceleration will be much smaller than previous art.

Figure 4:
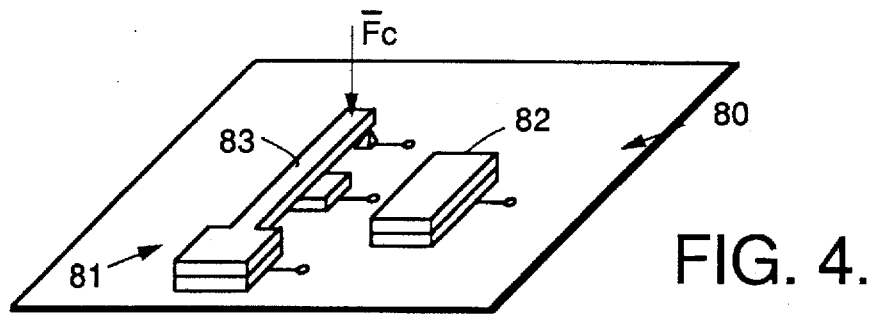
FIG. 4 is a perspective view showing a rotational sensor implementation of the invention.

FIG. 4 is a perspective view of a rotational sensor 80. The sensor 80 includes a z-axis sensor 81 and a control circuit which are essentially the same as the sensor 40 and circuit 43 of FIG. 2. In addition, a lateral control electrode 82 is disposed adjacent the cantilever electrode 83 of sensor 80 and is modulated with a voltage to induce a lateral vibration at a known maximum velocity $\overline{V_1}$ in the cantilever electrode. Sensor 80 measures a Coriolis force $\overline{F_c}$ given by: $\overline{F_c}=2m\,\overline{W_r}\times\overline{V_1}$ where m is the cantilever electrode's mass, $\overline{W_r}$ is the rotational rate and $\overline{V_1}$ is the cantilever electrode's lateral velocity. The rotational rate can be determined by measuring the Coriolis force, which is directly proportional to the rotation. In this embodiment, linear accelerations can produce additional deflections, causing incorrect estimates of the rotational rate. By placing a second rotation sensor on the wafer parallel to sensor 80 and laterally oscillating their respective cantilever electrodes 180° out of phase with each other, linear accelerations cancel each other.

Figure 5:
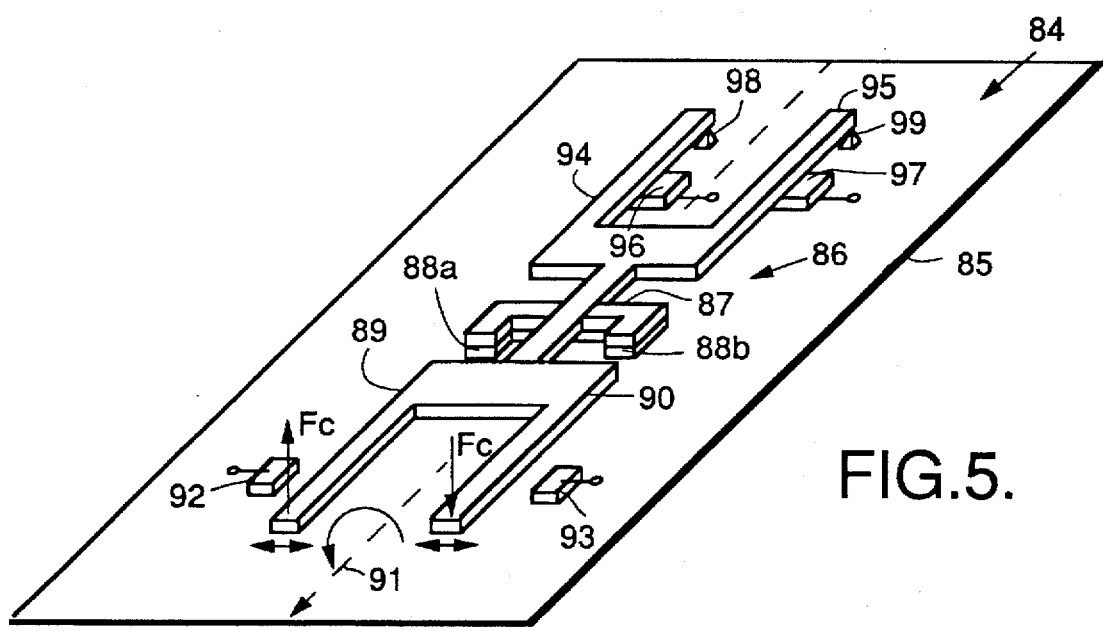
FIG. 5 is a perspective view showing the preferred rotational sensor.

FIG. 5 is a perspective view of a preferred embodiment of a rotational sensor 84 on a wafer 85 that is insensitive to linear acceleration forces. A double-ended tuning fork 86 is suspended above and parallel to the wafer 85 by a crossbeam 87 which is supported at its ends by posts 88a and 88b and is orthogonal to the tuning fork. The double tuning fork and cross-beam are preferably fabricated at the same step such that they form a unitary structure. Alternatively, the tuning fork can be formed on top of the cross-beam.

One end of the tuning fork 86 forks into a pair of cantilever beams 89 and 90 that are positioned parallel to a rotation axis 91 and have associated lateral control electrodes 92 and 93 respectively. The other end of the tuning fork 86 forks into a pair of cantilever electrodes 94 and 95 that are suspended above respective control electrodes 96 and 97 and respective tunneling electrodes 98 and 99, which are connected to control circuits similar to the one described in FIG. 2 to maintain constant tunneling currents. The forked ends are interconnected by a cantilever member 152 which is attached to the cross-beam.

The voltages applied to respective lateral electrodes 92 and 93 are modulated in synchronism such that their cantilever beams 89, 90 move 180° out of phase with each other in the plane of the wafer 85. As the sensor 84 rotates around its axis 91, equal but opposite z-axis forces $\overline{F_c}$ are applied to the respective cantilever beams to move them perpendicular to the surface of the wafer, producing a torque on the cantilever member 152 proportional to the Coriolis force. The torque tries to deflect the cantilever electrodes 94 and 95 but is opposed by the feedback circuitry. The rotational rate can be determined by taking the difference between the respective outputs. By moving the cantilever beams 89 and 90 180° out of phase with each other, the changes in the positions of cantilevers 94 and 95 due to linear accelerations are subtracted out and do not affect the rotation signal. The double-ended tuning fork configuration improves performance by separating the sensor fork (electrodes 94 and 95) from the drive fork (electrodes 89 and 90), thereby reducing the noise in the rotation signal.

Figure 6:
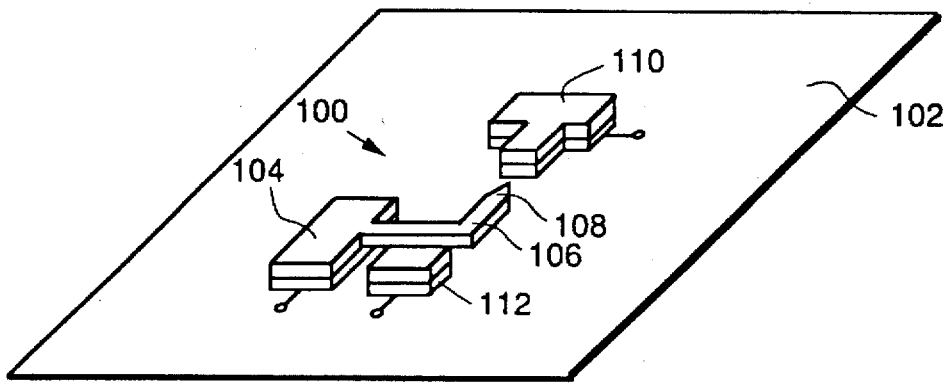
FIG. 6 is a perspective view of a lateral sensor implementation of the invention.

FIG. 6 is a perspective view of a tunneling tip sensor 100 for measuring lateral (x or y axis) forces. The sensor is formed on a semiconductor wafer 102. A cantilever electrode 104 extends from the wafer and includes and L-shaped section 106 with a tunneling tip 108 at its end. A tunneling electrode 110 is disposed adjacent and at the same height as the tunneling tip 108, with a separation of approximately 0.5 μm between the tunneling tip and the electrode. A control electrode 112 is formed adjacent and at the same height as the cantilever electrode. Alternatively, the tunneling tip 108 could be formed on the tunneling electrode instead of on the cantilever electrode. The cantilever arm deflects in the x-y plane perpendicular to the longer portion of the L-shaped section 106 in response to x or y axis forces, and modulates a tunneling current between the tunneling tip and electrode. An analog control circuit (not shown) similar to the one described in FIG. 2 is preferably used to maintain the tunneling current at a constant value. The sensor's sensitivity to z-axis forces is decreased by making its height or thickness several times its width.

Figure 7A:
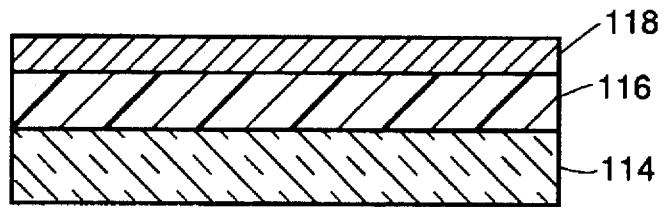
FIGS. 7a–7e are sectional view illustrating the photolithography method for fabricating the lateral sensor shown in FIG. 6.
Figure 7B:
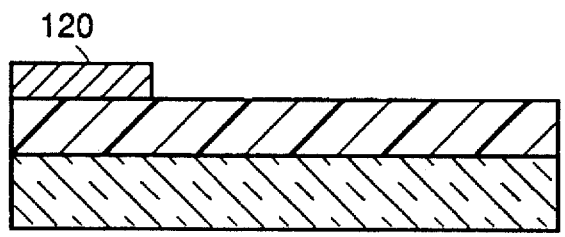
Figure 7C:
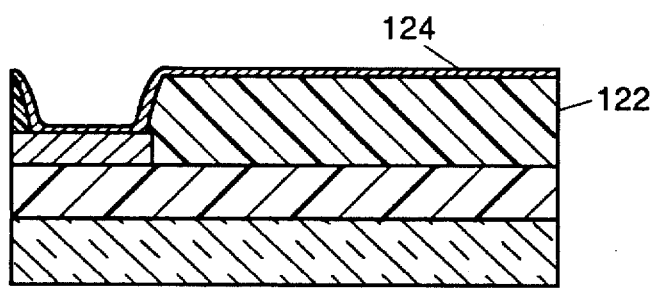
Figure 7D:
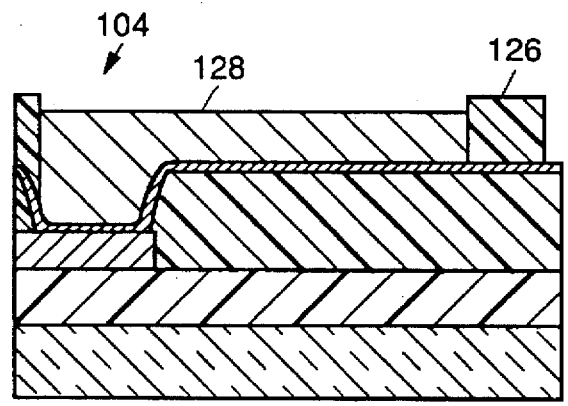
Figure 7E:
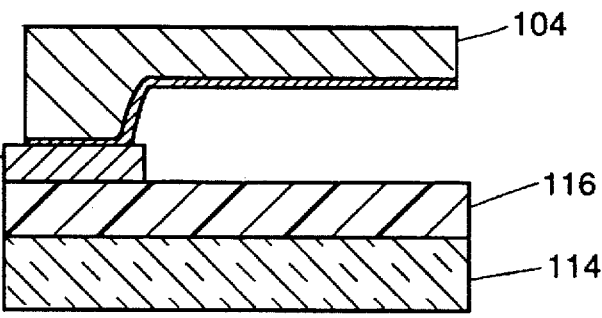

FIGS. 7a–7e are sectional views illustrating a preferred photolithographic technique for fabricating the lateral sensor 100 shown in FIG. 6. The cross-section is taken along the central axis of the cantilever electrode 104 and as such does not show the tunneling electrode, control electrode or tunneling tip, although these components are formed in the same photolithographic steps. In the first step a semiconductor wafer is provided with a semiconductor substrate 114, preferably silicon, a dielectric layer 116, preferably SiO$_2$, and a conductor layer 118, preferably gold (FIG. 7a). In the next step a photoresist is patterned onto the wafer and the conductor layer 118 is etched to define a cantilever pad 120, and control and tunneling pads adjacent the cantilever pad (not shown) (FIG. 7b). A sacrificial layer 122 is patterned to expose the three pads and a thin metal layer 124 is thermally evaporated over the wafer (FIG. 7c). In the next step another photoresist 126 is patterned to expose portions of metal layer 124 and a conductor layer 128, e.g. 1–4 μm thick, is electroplated onto the exposed portions of metal layer 124 to form the cantilever electrode and extend the tunneling and control pads to form the tunneling and control electrodes at the same height as the cantilever electrode (FIG. 7d). In the last steps resist 126 is dissolved, the exposed portions of layer 124 are removed by ion milling and the sacrificial layer 122 is removed either by wet or dry techniques as described previously (FIG. 7e).

Figure 8:
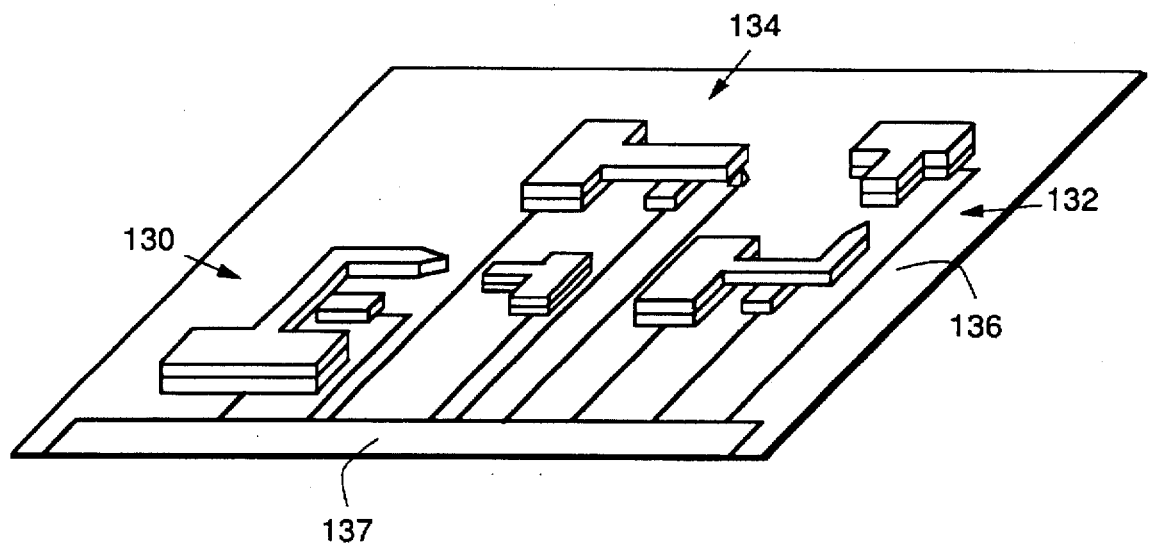
FIG. 8 is a perspective view of a planar three-axis sensor.

FIG. 8 is a perspective view of a planar x, y and z-axis sensor that incorporates the individual sensor structures and fabrication methods described above. X, y and z axis sensors 130, 132 and 134 are formed in a unitary structure on a semiconductor wafer 136 to produce a planar sensor device that senses forces in three dimensions. The individual sensors are connected to respective analog feedback circuits 137 and operate as described above. Note that the fabrication sequence for the x and y-axis devices can be incorporated into the sequence for the z-axis device without additional processing steps. In addition, x and y-axis rotation sensors can be added to the wafer using the same process sequence.

Figure 9:
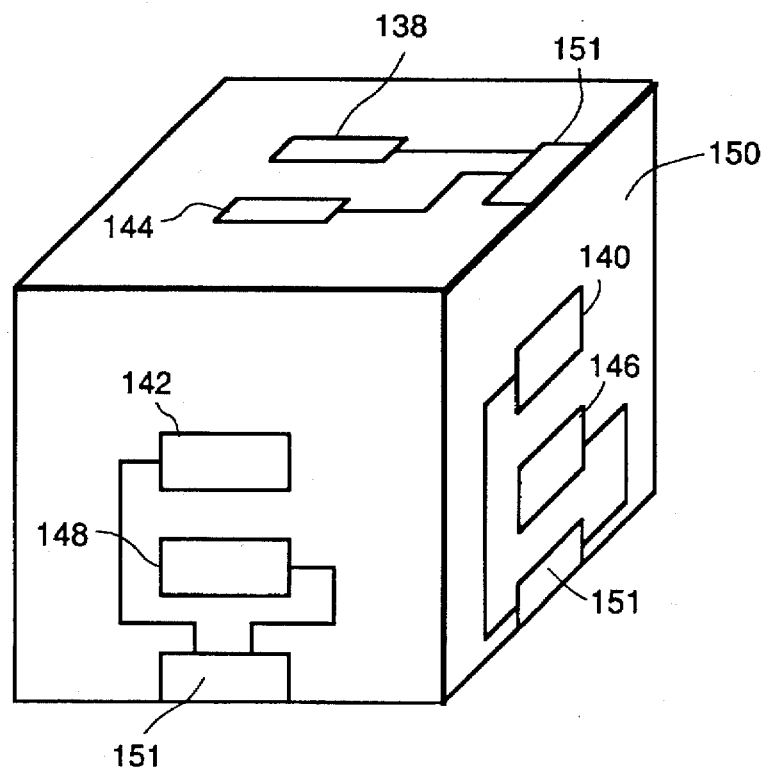
FIG. 9 is a perspective view of a 3-D inertial cube sensor.

FIG. 9 is a perspective view of a 3-D inertial cube that incorporates the z-axis and rotation sensors described previously. Z-axis sensors 138, 140 and 142 and rotation sensors 144, 146 and 148 are fabricated on respective wafers, which are attached to the mutually orthogonal faces of a cube 150 and electrically connected to respective analog feedback circuits 151. The cube senses 3-axis forces and rotations and can have a volume less than 8 mm$^3$. While a truly cubic structure is shown in FIG. 9, the important feature is that the three groups of sensors lie in mutually orthogonal planes. An equivalent orientation can be achieved with other geometric shapes, such as a block in which at least one face is a rectangle. The term "cubic" is used herein as a convenient shorthand to refer to any shape with three mutually orthogonal planes, not just a true cube. Other combinations of x-y-z axis sensors and rotation sensors can be implemented on each orthogonal face.

The described photolithographic process and resulting sensor structures have several advantages. Because the sensors are formed as unitary structures, the manufacturing yields are much higher than with previous methods, yields of approximately 80–90% can be achieved, with an accompanying reduction in production time and cost. The individual sensors can be less than 1 mm$^2$, with a cantilever arm mass of approximately 1 μg and bandwidth of 250 kHz. Thus the die size can be small, allowing more devices to be fabricated per wafer, and therefore at lower cost per device. The unbiased tip-to-cantilever distance can be only about 0.5 μm and can be pulled down to only a couple of nanometers with the application of a control voltage less than 20 V, thus allowing relatively low TTL and CMOS compatible supply voltages. The structure of the sensors reduces their sensitivity to off-axis forces, improves shock resistance, increases bandwidth and reduces temperature drift.

While several illustrative embodiments of the invention have been shown and described, numerous variations and alternative embodiments will occur to those skilled in the art. Such variations and alternate embodiments are contemplated, and can be made without departing from the spirit and scope of the invention as defined by the appended claims.

We claim:

1. A method for fabricating a tunneling tip sensor for sensing a z-axis force, comprising:

providing a single semiconductor wafer having a surface that lies in an xy-plane;

forming a metal layer on the wafer's surface;

photolithographically patterning the metal layer to form a cantilever pad and a tunneling electrode that adhere to the wafer's surface;

photolithographically extending the cantilever pad to form a cantilever electrode that extends over the tunneling electrode to define a tunneling tip sensor having a unitary structure on the semiconductor wafer, said cantilever and tunneling electrodes forming a part of a circuit in which a tunneling current flows between the cantilever and tunneling electrodes in response to an applied bias voltage across the two electrodes and in which a force applied along a z-axis perpendicular to the xy-plane urges said cantilever electrode to deflect relative to said tunneling electrode and to modulate an output signal.

2. The method of claim 1, wherein the metal layer is patterned to form a metal tip on the tunneling electrode.

3. The method of claim 2, wherein the tip is fabricated by:

depositing the metal layer on the wafer's surface to a known thickness;

patterning a resist over the metal layer to expose a portion of the metal layer;

ion milling the exposed portion of the metal layer to a reduced thickness to form the metal tip beneath the resist; and removing the resist.

4. The method of claim 3, wherein the resist is a negative resist that erodes during ion milling so that the tip is graded from a base at the surface of the metal layer to a narrower upper end.

5. The method of claim 2, wherein the cantilever pad is extended by:

photolithographically patterning a sacrificial layer over the wafer to expose said cantilever pad;

depositing a second metal layer over the sacrificial layer to adhere to the cantilever pad;

patterning said second metal layer to form the cantilever electrode; and removing said sacrificial layer.

6. The method of claim 2, wherein said cantilever and tunneling electrodes are formed from gold.

7. The method of claim 1, wherein the cantilever electrode is formed so that the tunneling tip sensor can sense z-axis forces at frequencies up to 250 kHz.

8. A method for fabricating a lateral tunneling tip sensor for sensing lateral forces, comprising:

providing a semiconducting substrate with a layer of conductive material that lies in an xy-plane;

photolithographically patterning the conductive material to form a cantilever pad and a tunneling pad;

photolithographically extending the cantilever pad to form a cantilever electrode that is suspended over the substrate and extending the tunneling pad to form a tunneling electrode adjacent to and at approximately the same height as said cantilever electrode to define a lateral tunneling tip sensor having a unitary structure on said substrate, said cantilever and tunneling electrodes forming a part of a circuit in which a tunneling current can flow between the cantilever and tunneling electrodes in response to a bias voltage applied across the electrodes and in which a force applied in the xy-plane urges said cantilever electrode to deflect laterally in the xy-plane relative to said tunneling electrode and to modulate an output signal.

9. The method of claim 8, wherein the cantilever pad is photolithographically extended such that said cantilever electrode has an 'L' shape with a first beam portion, a second beam portion that is shorter than and perpendicular to said first portion, and a tunneling tip that extends from said first portion parallel to the xy-plane, said cantilever electrode's first and second beam portions being thicker than they are wide such that the tunneling tip deflects substantially perpendicularly to said first beam portion with a high sensitivity in response to forces applied in the xy-plane and is relatively insensitive to forces applied perpendicularly to the xy-plane.

10. A method for fabricating a tunneling sensor for sensing rotation rate and having a unitary structure, comprising:

providing a substrate with a layer of a conductive material;

photolithographically patterning the conductive material to form a cantilever pad, a lateral control electrode and a tunneling electrode;

photolithographically extending the cantilever pad to form a cantilever electrode that extends over the tunneling electrode so that a tunneling current flows between the cantilever and tunneling electrodes in response to an applied bias voltage across the cantilever and tunneling electrodes and so that said lateral cantilever electrode vibrates laterally in response to a modulation voltage applied to the lateral control electrode, the lateral control, cantilever and tunneling electrodes forming part of a circuit that produces an output signal such that a Coriolis force, which urges the cantilever electrode to deflect relative to the tunneling electrode, modulates the output signal.

11. The method of claim 10, wherein the substrate is provided with a conductive tip on the conductive layer such that the tunneling electrode includes the tip.

12. The method of claim 11, wherein the tunneling tip is located on the underside of the cantilever.

13. The method of claim 10, further comprising providing a control electrode on the substrate below the cantilever electrode.

14. A method for sensing rotation rate, comprising:

(a) providing a tunneling sensor having an unitary structure including:

a substrate, a conductive cantilever electrode extending from the substrate and capable of deflection in response to a Coriolis force induced by rotation, a conductive tunneling electrode on the substrate, and a lateral control electrode;

(b) applying a bias voltage across the cantilever and tunneling electrodes so that a tunneling current flows between the cantilever and tunneling electrodes in response to the applied bias voltage, the cantilever and tunneling electrodes forming part of a circuit that produces an output signal such that the Coriolis force which urges the cantilever electrode to deflect relative to the tunneling electrode modulates the output signal;

(c) applying a modulating voltage to the lateral control electrode to induce a lateral vibration at a known maximum velocity in the cantilever electrode;

(d) determining the magnitude of the Coriolis force from the modulated output signal, and (e) determining the rotational rate from the magnitude of the Coriolis force.

15. The method of claim 14, further comprising a step between steps (b) and (c) of applying a control voltage to a control electrode on the substrate of the tunneling sensor to pull the cantilever electrode down to a reference position close to the tunneling electrode.

16. The method of claim 15 wherein the output signal is additionally applied to the control electrode and is modulated to offset the Coriolis force and maintain the tunneling current at a substantially constant level so that the value of the control voltage applied to the control electrode at any given time is a measure of the degree of cantilever electrode flexure.

17. The method of claim 15 wherein the tunneling current is modulated so that the control electrode voltage is maintained at a substantially constant level so that the value of the voltage applied to modulate the tunneling current at any given time is a measure of the degree of cantilever electrode flexure.

18. A method for fabricating a tunneling tip sensor for sensing a z-axis force, comprising:

providing a single semiconductor wafer having a surface that lies in an xy-plane;

forming an oxide isolation layer on the wafer's surface;

forming a metal layer on the isolation layer;

patterning a negative resist over the metal layer to expose a portion of the metal layer;

ion milling the exposed portion of the metal layer to a reduced thickness and, as part of said ion milling, eroding the negative resist to form a tunneling tip on the metal layer;

removing the negative resist;

patterning a positive resist over the metal layer that covers the tunneling tip and exposes selected portions of the metal layer;

etching the exposed portions of the metal layer down to the isolation layer to define a tunneling tip electrode that is integrally formed with said tip and a cantilever pad that adheres to the isolation layer; and photolithographically extending the cantilever pad to form a cantilever electrode that extends over the tunneling tip electrode to define a tunneling tip sensor having a unitary structure on the semiconductor wafer, said cantilever and tunneling tip electrodes forming a part of a circuit in which a tunneling current flows between the cantilever and tunneling electrodes in response to an applied bias voltage across the two electrodes and in which a force applied along a z-axis perpendicular to the xy-plane urges said cantilever electrode to deflect relative to said tunneling electrode and to modulate an output signal.

* * * * *